US 6,711,284 B1

(12) United States Patent
Koide

(10) Patent No.: US 6,711,284 B1
(45) Date of Patent: Mar. 23, 2004

(54) IMAGE PROCESSOR FOR A DIGITAL IMAGE OF AN OBJECT HAVING A CRACK

(75) Inventor: Hiroshi Koide, Kawasaki (JP)

(73) Assignees: Nikon Corporation, Tokyo (JP); Nikon Technologies, Inc., Tokyo (JP)

( * ) Notice: Subject to any disclaimer, the term of this patent is extended or adjusted under 35 U.S.C. 154(b) by 680 days.

(21) Appl. No.: 09/632,792

(22) Filed: Aug. 4, 2000

(30) Foreign Application Priority Data

Oct. 25, 1999 (JP) ............................................ 11-302659

(51) Int. Cl.⁷ .............................. G06K 9/00; G06K 9/46
(52) U.S. Cl. ........................ 382/141; 382/194; 382/203
(58) Field of Search ................................. 382/141, 192, 382/190, 194, 203, 275, 286; 702/155, 156, 170; 356/625, 626, 628, 635, 636; 348/125

(56) References Cited

U.S. PATENT DOCUMENTS

| | | | | |
|---|---|---|---|---|
| 4,519,041 A | * | 5/1985 | Fant et al. ................... 382/141 |
| 5,850,468 A | * | 12/1998 | Yokoyama et al. .......... 382/149 |
| 6,028,948 A | * | 2/2000 | Kil et al. ..................... 382/108 |
| 6,064,429 A | * | 5/2000 | Belk et al. ................... 348/128 |
| 6,167,150 A | * | 12/2000 | Michael et al. .............. 382/149 |
| 6,263,292 B1 | * | 7/2001 | Fiekowsky .................... 702/95 |
| 6,333,776 B1 | * | 12/2001 | Taniguchi ..................... 355/52 |
| 6,480,624 B1 | * | 11/2002 | Horie et al. ................. 382/165 |
| 6,535,621 B1 | * | 3/2003 | Fujita .......................... 382/112 |

FOREIGN PATENT DOCUMENTS

| | | |
|---|---|---|
| JP | A-05-66209 | 3/1993 |
| JP | A-10-78305 | 3/1995 |

* cited by examiner

Primary Examiner—Mehrdad Dastouri
Assistant Examiner—Virginia Kibler
(74) Attorney, Agent, or Firm—Oliff & Berridge, PLC

(57) ABSTRACT

An image processor for a digital image of an object having a crack is disclosed, the digital image being made of a plurality of pixels. The image processor comprises a counter for counting a number of the pixels relating to the crack within a selected portion of the image, the selected portion being of a known area, an investigator for investigating the relationship among the pixels relating to the crack within the selected portion of the image, and a width evaluator for evaluating the width of the crack corresponding to the selected portion of the image on the basis of the number of the pixels and the relationship among the pixels.

15 Claims, 15 Drawing Sheets

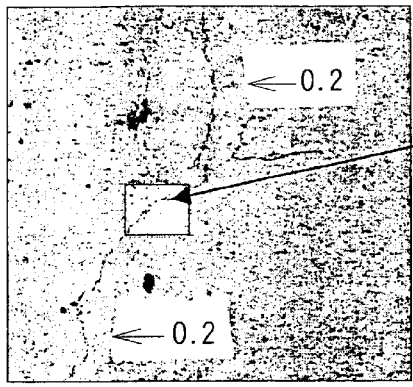
PORTION TO BE BINALIZED
NEAR THE MOUSE-CLICK POINT
FIG. 11A
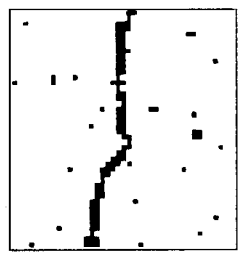  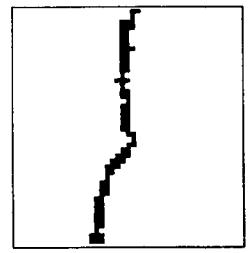
FIG. 11B      FIG. 11C
MAIN-AXIS LENGTH
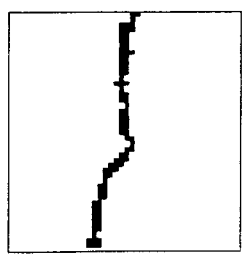   EQUAL AREA
              EQUAL MOMENT
                 OF INERTIA
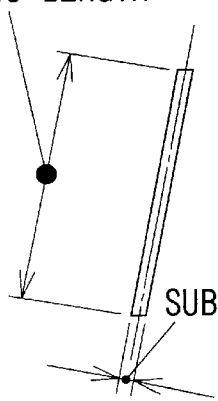
SUB-AXIS LENGTH
=CRACK WIDTH
FIG. 11D

IMAGE PROCESSOR FOR A DIGITAL IMAGE OF AN OBJECT HAVING A CRACK

BACKGROUND OF THE INVENTION

1. Field of Invention Technology

The present invention relates to an apparatus for evaluating a crack on an object by image processing of a digital image and, in particular, to an apparatus for evaluating the width of a crack on the surface of a concrete structure by image processing of a digital still color image.

2. Description of Related Art

On the surface of a concrete structure sometimes appears damage informing indices such as a crack, scaling, emergence of free lime (hereinafter referred to as free lime), and a sand pocket caused by structural or material deterioration due to aging. The damage degree of the concrete structure is evaluated based on the emergence conditions of the damage informing indices. The evaluator has located and evaluated the emergence conditions of the damage informing indices (the crack direction, length, width, and density; and the areal size of scaling and free lime) on the ground or through a silver-halide film photographic image of the concrete structure to be evaluated. The evaluator, however, necessarily have to be considerably trained and experienced to evaluate properly.

Measurement and digitalization of the damage informing indices support objective evaluation. The crack length and width, the area of scaling and free lime region, etc. are subjected to the digitalization.

The digitalization has been performed by, on the ground, directly measuring the damaged portion subject to the digitalization with a scale or a clearance gauge or by comparing the portion with standard photographs of cracks with various widths; or by measuring the damage informing indices on a silver-halide photographic image with a scale or a planimeter.

However, the activities on the ground require that the evaluator should all the way come to the field and come near the damaged portion, resulting in much time and trouble to perform the evaluation. On the other hand, when measuring the damage informing indices on a silver-halide photographic image with a scale or a planimeter, because, starting with taking photographs on the ground, developing and printing time is necessary to obtain a photographic image and because, furthermore, much trouble must be taken to measure the indices on the obtained photographic image, it has been difficult to quickly complete the evaluation process.

With regard to a number of concrete structures built in the decade began in 1965, damaged portions on them have recently come under observation, and the need to evaluate damage on concrete structures is keenly felt. But, because, as mentioned above, the number of the evaluator is limited and the evaluation requires a lot of time, the increasing demand for the damage evaluation might not be satisfactorily satisfied.

Recently, in consideration of the above situation, an image processing apparatus that digitizes the crack length, the area of scaling and free lime region, etc. through image processing based on a digital still image taken with a digital still camera has gradually been employed. A digital still image taken with a digital still camera facilitates quick acquisition of necessary images, and the digitizing measurement of the crack length, the area of scaling and free lime region, etc. can be quickly completed by tracing the crack and the boundaries of scaling and free lime region displayed on the display portion of the image processing apparatus by the use of a pointer such as a mouse.

The image processing of the image processing apparatus is implemented multiplying the number of pixels lying on a line defined with the pointer on the digital still image or the number of pixels lying within a closed curve drawn with the pointer on the digital still image by the dimension or area on a target object corresponding to the pixel size, i.e., the actual size. The "pixel" is to be understood to be a "picture element" which constitutes a digital still image. A picture element constituting the image pick-up device of a digital camera is also called a pixel. Each pixel of a digital camera generally corresponds to a pixel of an image.

In the above-mentioned apparatus, a binalizing process with a threshold value of an appropriate density value and edge enhancing process are appropriately performed.

SUMMARY OF THE INVENTION

In the meantime, a conventional image processing apparatus is adapted to monochrome images taken with, for example, an industrial digital camera. The line width measurement method used in the conventional image processing apparatus presupposes that a measured line width corresponds to the width from a number of pixels of an image pick-up device, and there has been no measurement method applicable to a narrow line width corresponding to a size less than a single pixel size.

Actually, in many cases, the aforementioned crack width is narrow. When the crack width corresponds to a size less than the single pixel size of an image pick-up device of a digital camera, the conventional image processing apparatus, even if it could visually show the existence of different cracks to be measured, was not able to detect the crack width difference among the cracks.

To address such narrow crack width, a high shooting magnification is required in order that the minimum crack width to be measured may correspond to the size from a plurality of pixels on the image pick-up device. This reduces the target object area taken in on a single image, and thus a number of segmented photographic images need to be taken to cover the overall target object; consequently, the longer time is necessary to complete the shooting and the analysis of the images, and much trouble has to be taken to control the images. Furthermore, it is not easy to determine, with regard to each image, the corresponding part on the target object, and, as a result, it is not easy to get the crack in perspective only by the images.

The actual size corresponding to one pixel of an image pick-up device is defined as the product of the pixel size of the image pick-up device and a inversion of a shooting magnification. Digital cameras with small pixel size commercially available now have a pixel of, for example, 0.004- or 0.01-mm-square. The shooting magnification is defined as the ratio of the actual size photographed to the image pick-up device size. The image pick-up device sizes of the above-mentioned digital cameras are 6.4*4.8 mm and 23.7*15.6 mm, respectively.

Color digital cameras with high pixel density have recently been developed, and the actual sizes corresponding to one pixel of their image pick-up devices are almost equal to those of industrial digital cameras. To evaluate the damage degree of concrete, it is also important to observe discoloration conditions on and around a crack, scaling, and a free lime portion. Thus, it is preferable that a photographic image carrying the damaged concrete portion's image be a digital color image. Additionally, the techniques used in the above-mentioned conventional image processing apparatus are utilized also in the damage evaluation through such a digital color image; however, the narrow crack width measurement problem is still pending.

It is an object of the present invention to provide a crack evaluation apparatus that can numerically evaluate a crack width less than a single pixel size of a digital image through processing the digital image.

It is another object of the present invention to provide a crack evaluation apparatus that can evaluate a crack width accurately.

It is another object of the present invention to provide a crack evaluation apparatus that can evaluate a crack width by processing an image including noises.

In order to achieve the above objects the present invention provides an image processor for a digital image of an object having a crack comprising a counter for counting a number of pixels of the image relating to the crack within a selected portion of the image, the selected portion being of a known area, an investigator for investigating the relationship among the pixels relating to the crack within the selected portion of the image, and a width evaluator for evaluating the width of the crack corresponding to the selected portion of the image on the basis of the number of the pixels and the relationship among the pixels. Thus, the processor can evaluate the width of the crack which would be impossible in the prior art.

Pursuant to another aspect of the present invention, the image processor further comprises a noise eliminator for eliminating pixels not relating to the crack from the selected portion of the image so that the pixels not relating to the crack is not counted by the counter. Thus, the processor can evaluate the width of the crack accurately against the noises of the image.

Pursuant to still another aspect of the present invention, the digital image which is processed by the image processor is a color digital image. Thus, the width of the crack less than the size of the pixel of the image can be evaluated.

Pursuant to still another aspect of the present invention, the image processor further comprises a compensator for compensating a distortion of the digital image to get an orthogonal projection image, wherein the selected portion of the image is set on the orthogonal projection image. Accordingly, the processor can evaluate the width of the crack accurately against the distortion of the image. A plurality of thus compensated images can be combined to a form a single image which covers wide area. This makes it possible for the processor to evaluate a large floor board easily.

According to the above features and advantages of the present invention, a narrow crack width can be evaluated with low magnification photography of a wide angle, which makes it easy to identify the photographed area. Further, a less number of shots can cover an entire target field, which reduces the time for taking the photographies and analizing them.

BRIEF DESCRIPTION OF THE DRAWINGS

FIG. 11 is a drawing showing the images corresponding to different steps of FIG. 10.

DETAILED DESCRIPTION OF PREFERRED EMBODIMENTS

The present inventor has carefully observed digital still color images enlarged to the maximum showing cracks of various widths and found that a crack of a width corresponding to a size of less than a single pixel size on the image influences the density of a number of pixels on the image and that the wider the crack width, the larger number of pixels are influenced.

The inventor has further found that there is a sufficiently practically-usable correlation between the crack width and the number of pixels whose image data is 1 on the binalized image of the digital still color image in which the crack is photographed and invented an image processing apparatus for evaluating the crack width based on the correlation.

As an embodiment of the present invention, an apparatus of the invention applied to the evaluation of the crack on the floor board of a ferroconcrete bridge will be described. The present invention apparatus is an image processing apparatus that reads a digital image data from a digital still color image (hereinafter referred to as digital image or simply as image) carrying a photographic image of a target concrete structure and processes the digital image data and is constituted of, for example, a personal computer and programs running thereon.

Figure 1A:
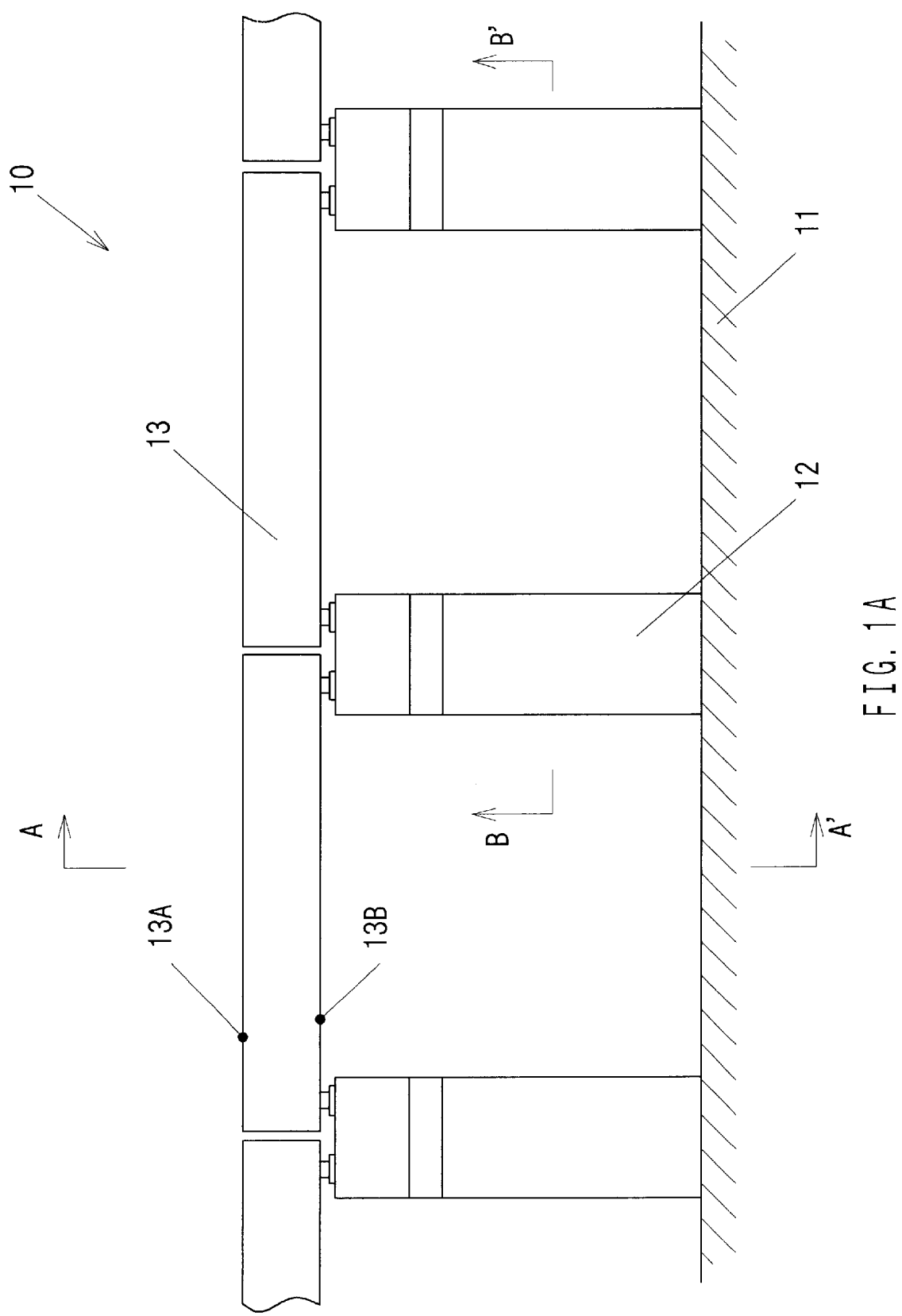
FIG. 1 is a drawing illustrating the structure of a concrete bridge, an example of a target object.
Figure 1B:
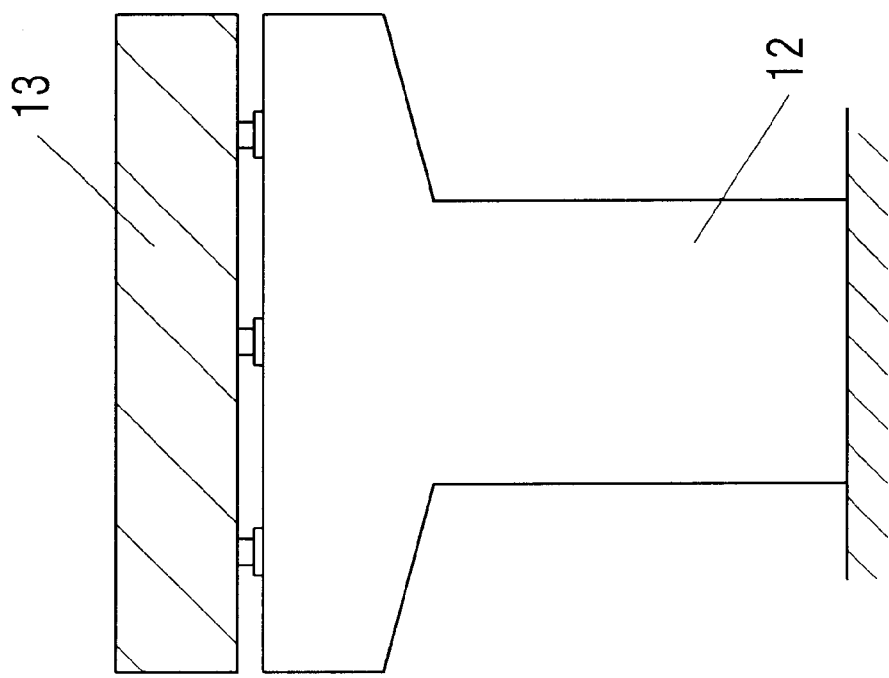

FIG. 1A and FIG. 1B shows an example of a bridge structure; FIG. 1A is an front view thereof; and FIG. 1B is a side view thereof viewed along the arrow A–A' in FIG. 1A). Bridge 10 is constituted of support legs 12 fixed in the ground 11 with a predetermined distance and floor boards 13 supported on the upper surfaces of support legs 12. On the upper surface 13A of floor board 13 are disposed a road surface and a surface for laying a railroad track; thus, the concrete surface is paved or metaled and cannot be directly seen. On the other hand, the lower surface 13B of floor board 13 can be easily observed from the direction of the ground 11, and a digital image thereof taken in by a digital camera can be easily obtained.

Figure 2:
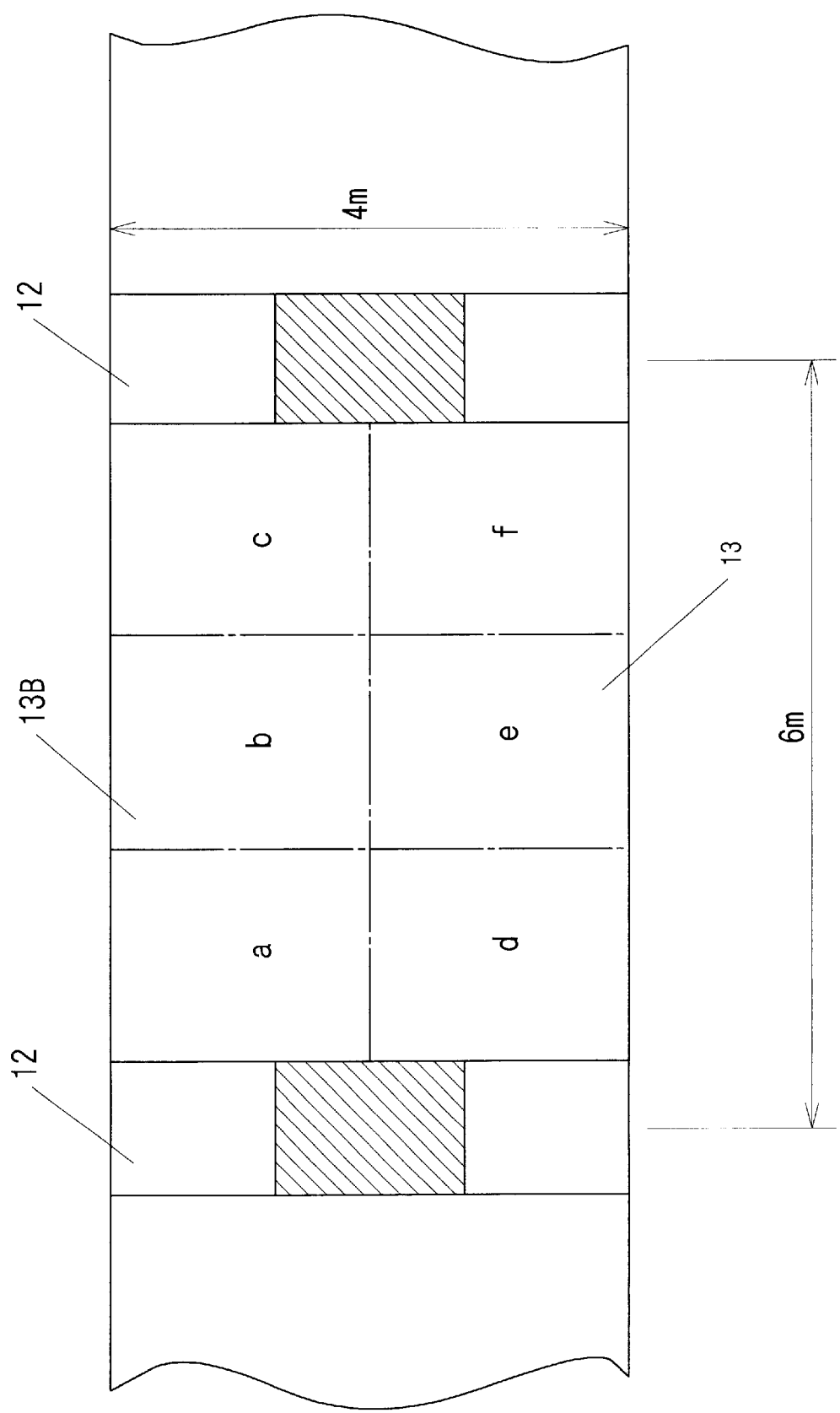
FIG. 2 is a bottom view of the concrete bridge of FIG. 1.

FIG. 2 is a bottom view (viewed along the arrow B–B' in FIG. 1A) of the above-mentioned bridge 10. Although the size of the floor board 13 disposed between the support legs 12 may differ depending on bridge design, it is usually constant with regard to a bridge, for example, of about 6 m*4 m. The floor board lower surface 13B is photographed by the digital camera. On the occasion, a plurality of points including three points which are not lying on a line and of which relative position is known are photographed. "Relative position is known" means that the difference the coordinate values of any two pints of the plurality of points can be expressed by means of a coordinate system set at an arbitrarily position (a rectangular coordinate system, a polar coordinate system). The vertexes of a rectangle of a known size are preferably chosen as the plurality of points because the relative position of the four vertexes can be expressed only by the two values representing its two sides.

Further, in order to allow easy determination of correspondence between the photographed image and the actual floor board, it is preferable that an appropriate area of the board be photographed in an image. It is most desirable that the overall of a floor board lower surface 13B be photographed in an image. The lower the shooting magnification, the broader area can be photographed.

On the other hand, when the crack width subject to damage evaluation is, for example, 0.2 mm or over, an appropriate shooting magnification must be applied so that an image allowing the recognition of a crack of down to 0.2 mm width be photographed. The higher the shooting magnification, the narrower width cracks can be photographed. When an equal shooting magnification is applied, the smaller the pixel size of the image pick-up device of a digital camera, the narrower width cracks can be photographed. The product of a pixel size and a inversion of a shooting magnification is the measurement resolution according to the conventional image processing method, and when a crack width exceeds the product value, the crack width could be digitized, but when the crack width is less than the product value, the crack width, although the existence of the crack itself could be recognized, could not be distinguished.

In this embodiment, in consideration of the above-mentioned mutually contradictory two conditions, a shooting magnification that allows, for example, a shot area a little larger than that of 2 m*2 m is chosen. Under this condition, in the case of the digital cameras having the aforementioned image pick-up device sizes, the shooting magnifications are X 0.0024 and X 0.0078, respectively, and the actual sizes on the floor board lower surface 13B corresponding to one pixel are 1.7 mm and 1.3 mm, respectively. Note that the choice of the shooting magnification is performed by selecting the focal length of the camera lens; more specifically, by changing interchangeable lenses or by zooming with a zoom lens.

Also, in order to prevent the loss of the image data caught by the image pick-up device of the digital camera during its memory or processing, the image data should preferably be treated without data compression. At least, irreversible data compression is not applied.

The floor board lower surface 13B having the size of 6 m*4 m is photographed at the chosen shooting magnification as six (=3*2) images. Each of the images corresponds to each of the areas a~f in FIG. 2 segmented by phantom lines (alternate long and short dash lines).

Each area is one-sixth of the area of the floor board lower surface 13B excluding the area that, being hidden by the support legs 12 can not be photographed.

Figure 3:
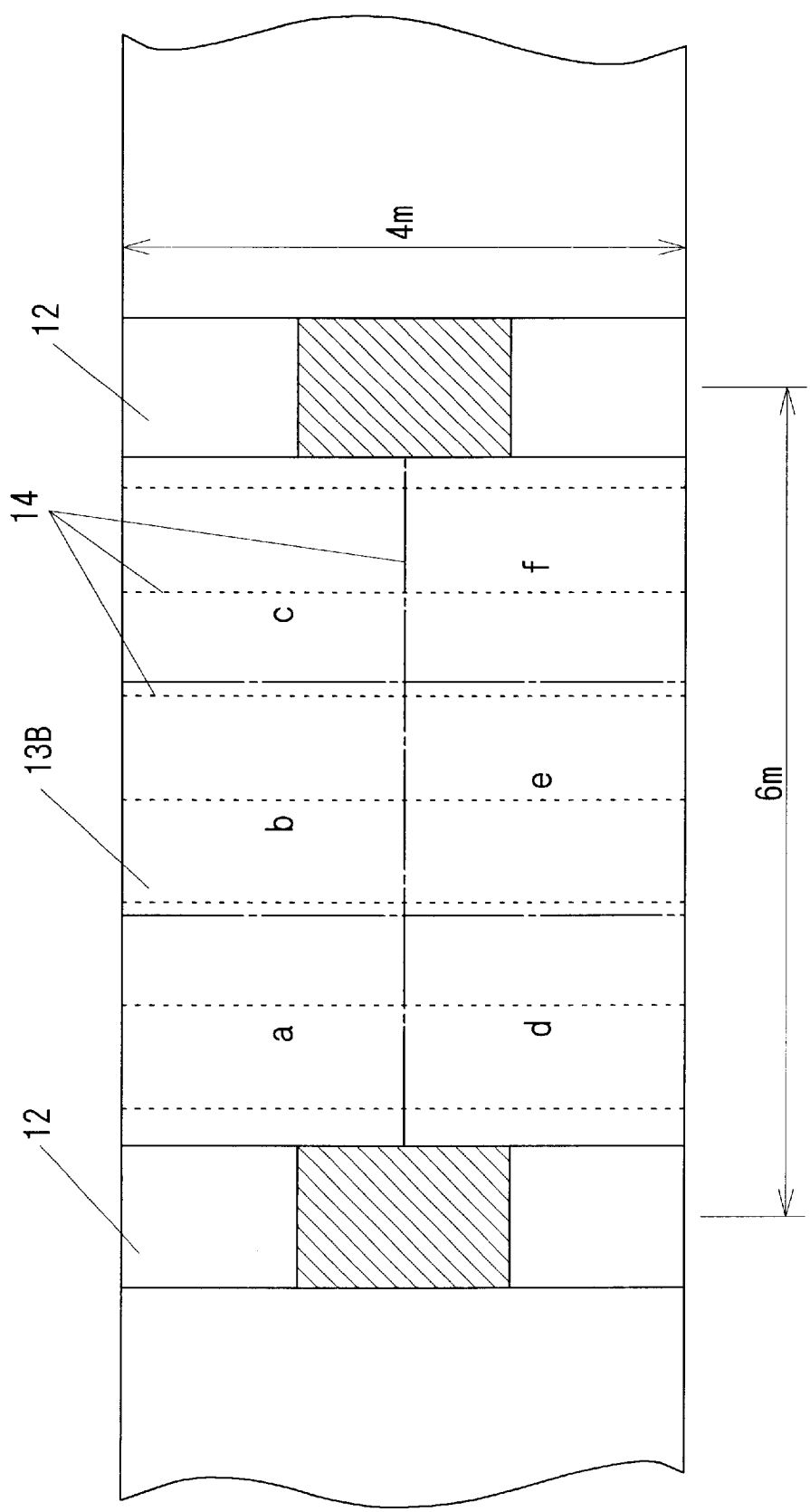
FIG. 3 is a drawing illustrating the way in which the floor board of FIG. 2 is photographed.

On the floor board lower surface 13B are left the traces of formworks used when the concrete of the floor board was filled. The condition is shown by the dashed lines in FIG. 3. Because the formwork traces 14 form rectangles of a known size (in this case, of 0.75 m*2 m), each of the vertexes of the rectangles is utilized as one of the above-mentioned points of which relative position is known.

Figure 4:
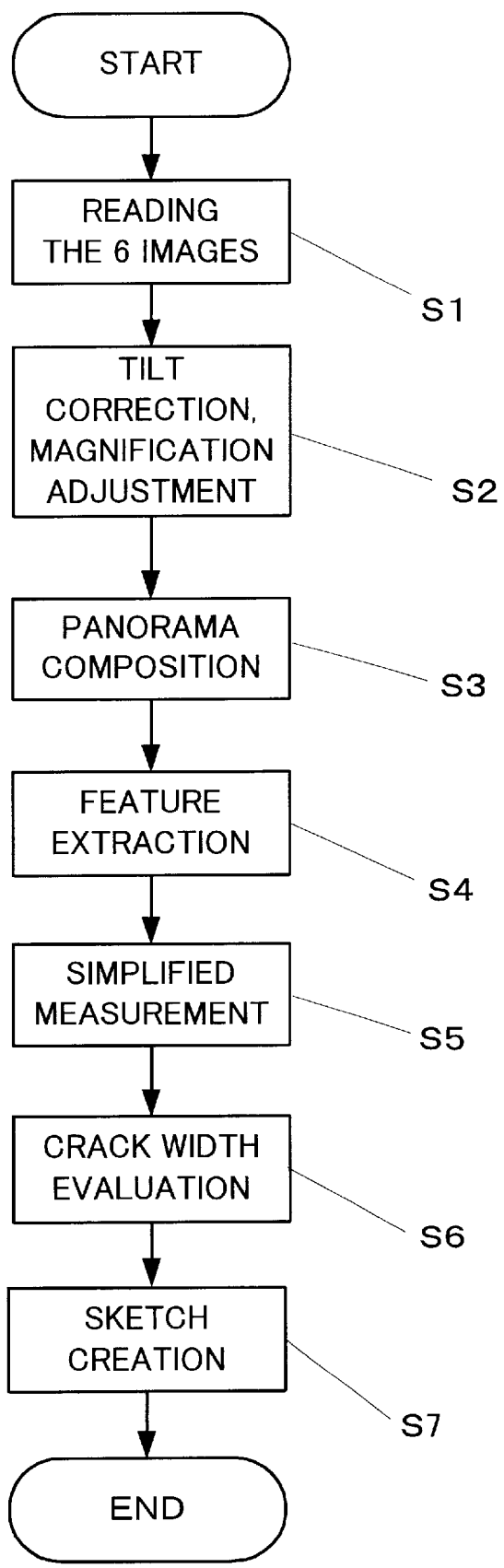
FIG. 4 is a flowchart illustrating the procedure of the image processing performed by the present invention apparatus.

The image processing apparatus of the embodiment, by processing the above images photographed, measures the crack length and the areal size of scaling and free lime and evaluates the crack width. The personal computer constituting the image processing apparatus is loaded with a tilt correction program, a magnification adjustment program, a panorama composition program, a simplified measurement program, a crack evaluation program, and a sketch generating program, etc. FIG. 4 is a flowchart illustrating the procedure for performing the above-mentioned measurement and evaluation using these programs.

At step 1 of FIG. 4, the six images carrying the photographic images of the floor board lower surface 13B are read by the personal computer through the digital camera.

At step 2, a tilt correction process and a magnification adjustment process are applied to the images read. At step 3 the six images experienced the two processes are composed into an image through a panorama composition process. At step 4, a feature extraction process for increasing the crack visibility is applied. At step 5, the crack length and the areal size of scaling and free lime are measured through a simplified measurement process. At step 6, the crack width is evaluated through a crack evaluation process. At step 7, the outline of the floor board, the pointer path traced during the simplified measurement process, the values determined by the simplified measurement process, and the evaluation results of the crack width are created as a sketch drawing shown in FIG. 14.

Note that the panorama composition process of step 3 and the simplified measurement process of step 5 may be left out when unnecessary to be applied. Next, each of the processes will be described in detail.

First, the tilt correction and magnification adjustment processes of step 1 will be described. In many cases, the floor board lower surface 13B is photographed from an oblique direction. As a result, each image photographed is distorted; the originally-rectangular floor board lower surface 13B is photographed as a trapezoid or as a further distorted figure from a trapezoid. Similarly, the above-mentioned traces of formworks are photographed as a trapezoid or as a further distorted figure from a trapezoid.

Figure 5:
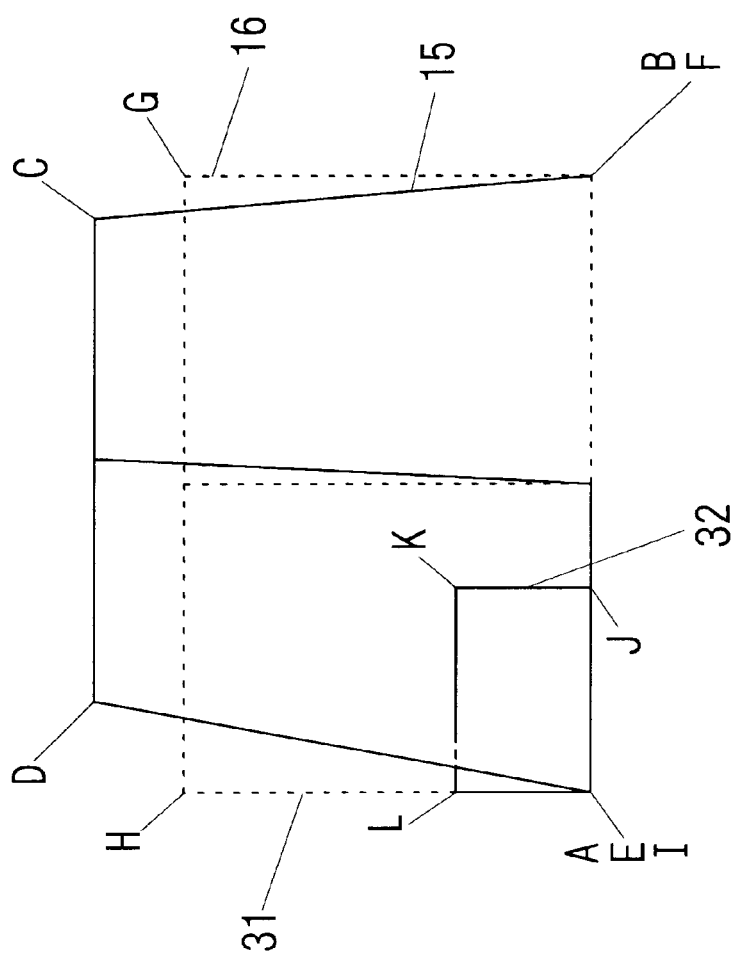
FIG. 5 is a drawing illustrating the principles of the tilt correction process and the magnification adjustment process of FIG. 4.

FIG. 5 is a schematic view exclusively illustrating the condition in which the traces of two formworks in the area "b" of the floor board lower surface 13B are distortedly photographed. In FIG. 5, reference numeral 15 designates the outlines of the traces of formworks distortedly photographed. The outline figure, when it was not distorted, would have been rectangle 16. Here, a tilt correction process for converting the distorted image into an orthogonal projection image is applied. The tilt correction process is executed with the tilt correction program running on the personal computer.

Figure 6:
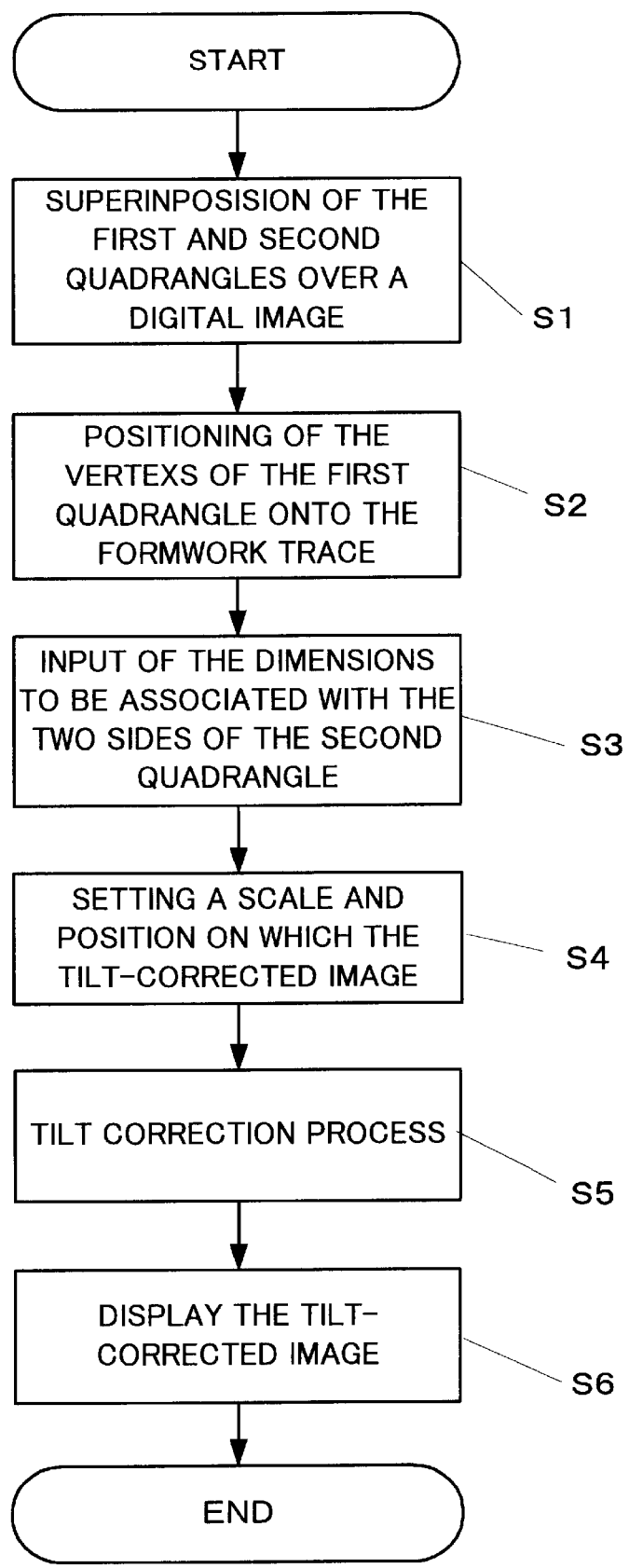
FIG. 6 is a flowchart illustrating the procedures of the tilt correction process and the magnification adjustment process of FIG. 4.

Referring to the flowchart of FIG. 6, the tilt correction process procedure will be described. It is assumed that the images of the floor board lower surface 13B is displayed on the personal computer's display portion. When the tilt correction program is initiated, at step 1, first quadrangle 31 (E-F-G-H) and second quadrangle 32 (I-J-K-L) are superimposed over the image of the floor board lower surface 13B on the display portion. Both of the two quadrangles 31 and 32 can be moved to any position on display portion by any side of them being dragged and dropped. In FIG. 5, the vertexes E and I of the two quadrangles are positioned onto the vertex A of a formwork trace (A-B-C-D), and also the vertex F is positioned onto the vertex B.

At step 2, the vertexes E~H of the first quadrangle 31 are positioned onto the vertexes A~D of the formwork trace 15, respectively. The figure of the first quadrangle 31 changes after each vertex of it being dragged and dropped. Note that the figure of the first quadrangle 31 displayed at step 1 is rectangular.

At step 3, dimensions to be associated with the two sides of the second quadrangle (rectangle) 32 are inputted. In response to the input, the figure of the second quadrangle 32 displayed changes into a rectangle whose aspect ratio is equal to the ratio between the inputted dimensions. In other words, when 1500(750*2) mm and 2000 mm are inputted as the dimensions, the second quadrangle 32 changes into a rectangle whose aspect ratio is 3:4. The second quadrangle 32 of FIG. 5 is in this state.

Alternatively, it may be so configured that at step 3, coordinate values of each of the vertexes A~D of formwork trace are inputted and that the coordinate value differences between the vertexes are used as the dimensions of the two sides of the second quadrangle 32.

At step 4, a scale and position on which the image after being tilt-corrected is set. The overall size of the second quadrangle 32, while the aspect ratio being maintained constant, changes by its vertex being dragged. It is not necessarily be required that a side of the second quadrangle 32 coincides with a side of the formwork trace as shown in FIG. 5.

In the tilt correction process of step 5, a process in which the vertexes E~H of the first quadrangle 31 changed into the formwork trace 15 figure are made coincided with the vertexes I~L of the second quadrangle 32, respectively, is performed. A calculation to convert the image data of the distorted image into an image data of an orthogonal projection image is performed in the tilt correction process. The changed first quadrangle 31 is corrected to a rectangle on the image data. Further, a magnification adjustment is performed so that the first quadrangle 31 corrected to a rectangle coincides with the second quadrangle 32.

The sides A-D and A-B not experienced the tilt correction process have been thus associated with 2000 mm and 1500 mm, respectively. That is, when the number of pixels contained in the side A-B is X1 and the number of pixels contained in the side A-D is Y1, the actual sizes X and Y corresponding to a pixel can be expressed as follows:

$X=1500/X1$ mm $Y=2000/Y1$ mm

The magnification adjustment process may be separated from the tilt correction process, and the processes may be performed at any stage independently from each other.

At step 6, the image to which the tilt correction and magnification adjustment processes have been applied is displayed on the display portion.

Figure 7:
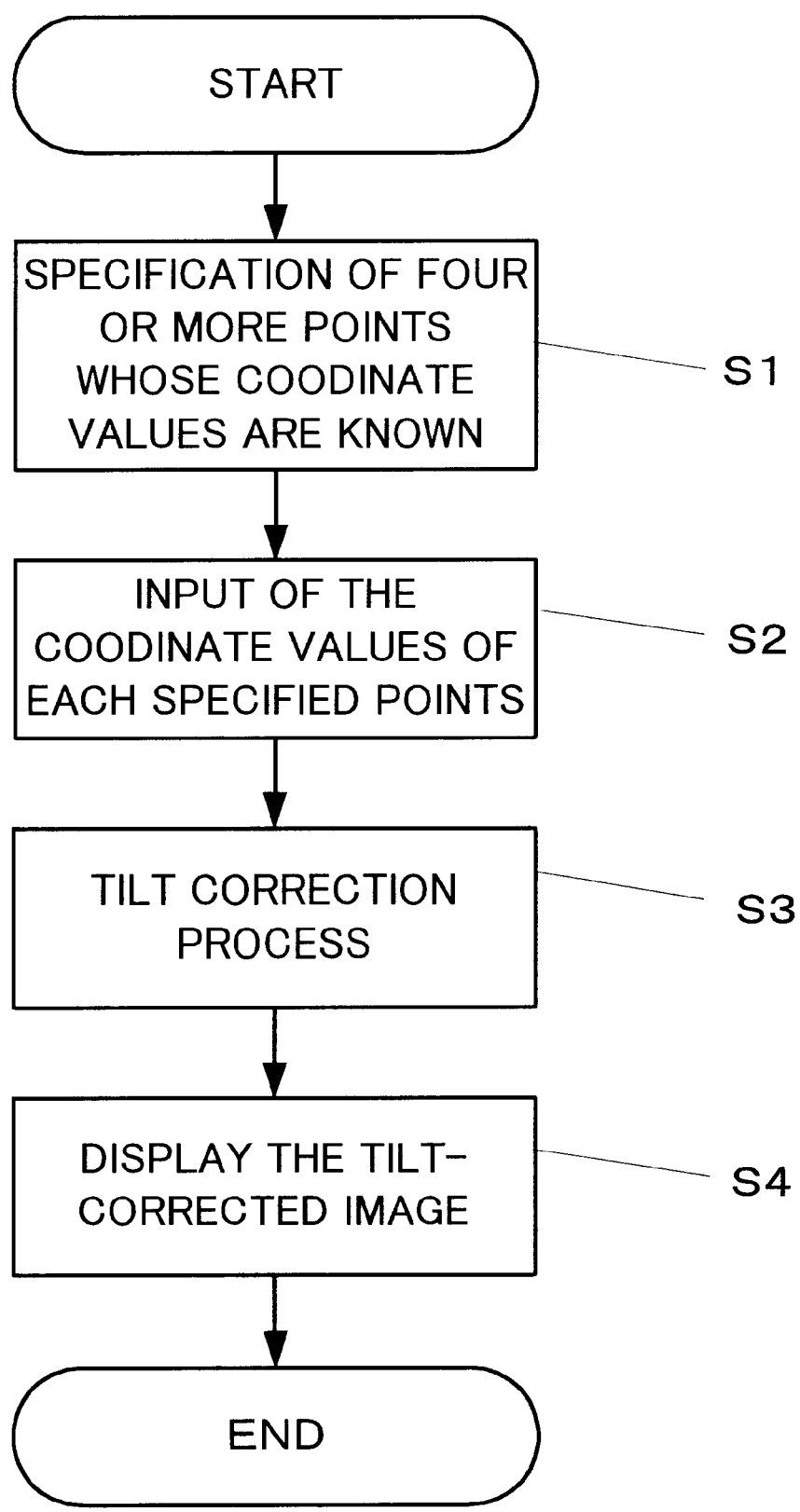
FIG. 7 is a flowchart illustrating the procedure of a different tilt correction method.

When a rectangle such as the formwork trace 15 is not present in the photographed image of the floor board lower surface 13B, tilt correction methods different from the above are applied. Referring to a flowchart shown in FIG. 7, an example of the methods will be next described.

At step 1, four or more points within the image which are not on a line but whose relative position, i.e., coordinate values are known are specified. The four or more points are preferably located apart as much as possible. At step 2, the coordinate values of each of the four or more points are inputted.

Next, at step 3, a tilt correction process in which the image is changed so that each of the specified points is positioned onto a point directly proportional to the respective inputted coordinate values is performed. The changed image through the tilt correction process is an orthogonal projection image in which the distorted image due to a tilt when photographed is corrected. In parallel with the image changing process, the actual sizes corresponding to a pixel are calculated based on the differences of the coordinate values between the specified points and on the number of pixels between the respective specified points.

At step 4, the image to which the tilt correction process has been applied is then displayed.

Figure 8:
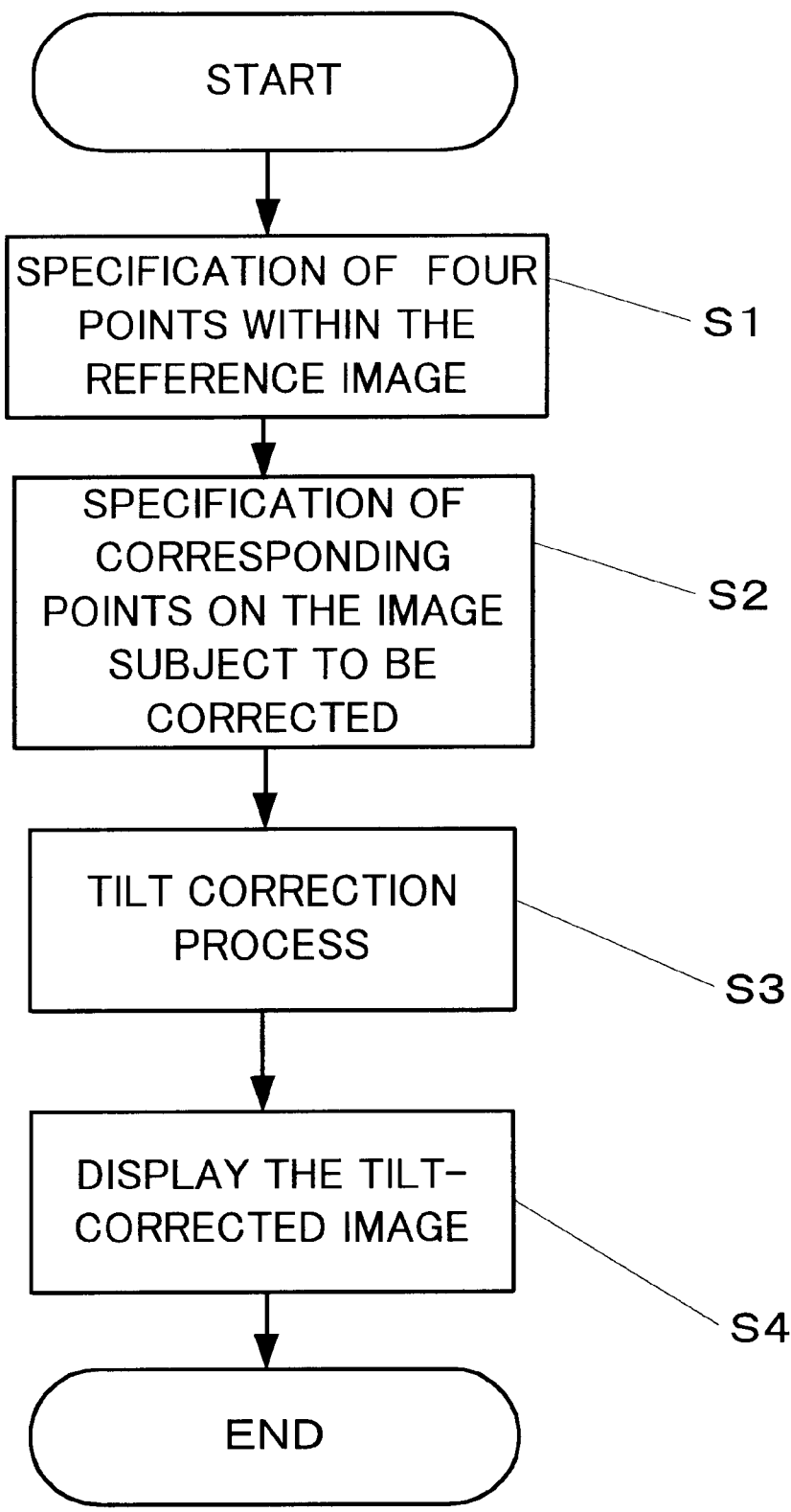
FIG. 8 is a flowchart illustrating the procedure of still another tilt correction method.

Still another tilt correction method will be described, referring to FIG. 8 showing a flowchart of the method. In the tilt correction method, an image containing a target portion that was previously photographed and already applied with a tilt correction process is used as a reference image for the tilt correction method. Specifically, at step 1 of FIG. 8, four points arbitrarily chosen within the reference image which are not on a line are specified. Next, at step 2, points on a newly photographed image subject to the tilt correction method corresponding to the specified four points are specified.

At step 3, the image subject to the tilt correction method is changed so that the four points specified at step 2 coincide with the respective four points specified at step 1. The changed image is an orthogonal projection image in which the tilt distortion is corrected. At step 4, the image to which the tilt correction process has been applied is then displayed.

Note that the actual sizes corresponding to a pixel are also calculated by any one of the above-described methods.

Since the image applied with the tilt correction process is displayed at the same magnification with the reference image, the condition of the floor board at the time when the reference image was photographed can be easily compared with the condition of the floor board at the time when the image was newly photographed.

In each of the above-mentioned tilt correction methods, projective transformation parameters for projecting the specified points on the distorted image (the vertexes E~H of the first quadrangle 31 of FIG. 5, the points of which coordinate values are known specified at S1 of FIG. 7, and the points specified at S2 of FIG. 8 corresponding to the points within the reference mage specified at S1) onto the respective predetermined positions on the image applied with the tilt correction process (the vertexes I~L of the second quadrangle 32 of FIG. 5, the positions directly proportional to the coordinate values inputted at S2 of FIG. 7, and the positions of the points within the reference mage specified at S1 of FIG. 8) are determined; and the image data of the pixels of the image applied with the tilt correction process are determined as the corresponding image data of the pixels of the image subjected to the tilt correction process determined by the projective transformation parameters.

Note that the tilt correction process is not necessary when the image of the lower surface 13B has no image distortion or small image distortion less than an allowable precision of the evaluation. The image photographed from the position under the floor board 13 has no image distortion or small image distortion.

The panorama composition process of step 2 of FIG. 4 is a process in which a plurality of images applied with the tilt correction process are combined into an image and by which grasping the overall floor board's damaged condition and related information control are facilitated. This process may be performed as needed.

In the panorama composition process, two images having a common image region are combined into an image so that two or more points on one of the two images specified with mouse-clicks coincide with the corresponding two or more points of the other two image specified with mouse-clicks through image rotation and parallel-translation. In order to enable this, when the floor board lower surface 13B is photographed as the segmented areas a~f (see FIG. 2), each of the areas is photographed so that the image of each area is appropriately extended over the neighboring areas. When the shooting magnifications of the two images subject to the panorama composition process are mutually different, a process in which the magnification of the image to be combined is made equal to the magnification of the image referenced to is applied.

By repetitively applying the process to neighboring images, the separated six images can be combined into a panoramic image. The panorama composition process is also executed with the panorama composition program running on the personal computer. Note that because, with regard to the panorama composition technique, various kinds of methods are known, an appropriate method may be applied.

The feature extraction process of step 3 of FIG. 4 is a process in which the crack on the above-mentioned image is enhanced and is the same or similar process as commercially available photo-retouching software's "sharp" or "unsharp" process. The feature extraction process facilitates the recognition of the crack, etc. This process may be performed prior to the tilt correction or panorama composition process. The feature extraction process is also executed with the feature extraction program running on the personal computer.

The simplified measurement process of step 4 of FIG. 4 is applied to an image already applied with the above-mentioned tilt correction and magnification adjustment processes or to an image additionally applied with the feature extraction process. By tracing a crack subject to the measurement with a mouse pointer, the crack length is determined and displayed on the display portion. By tracing the closed curve surrounding the area of scaling or free lime region with the mouse pointer, the length of the closed curve or the area defined by the closed curve is determined and displayed on the display portion. The pointer path is displayed in green. The simplified measurement process is also executed with the simplified measurement program running on the personal computer.

Note that the simplified measurement process uses a method directed to monochrome images and has practically-usable measurement accuracy.

Figure 9:
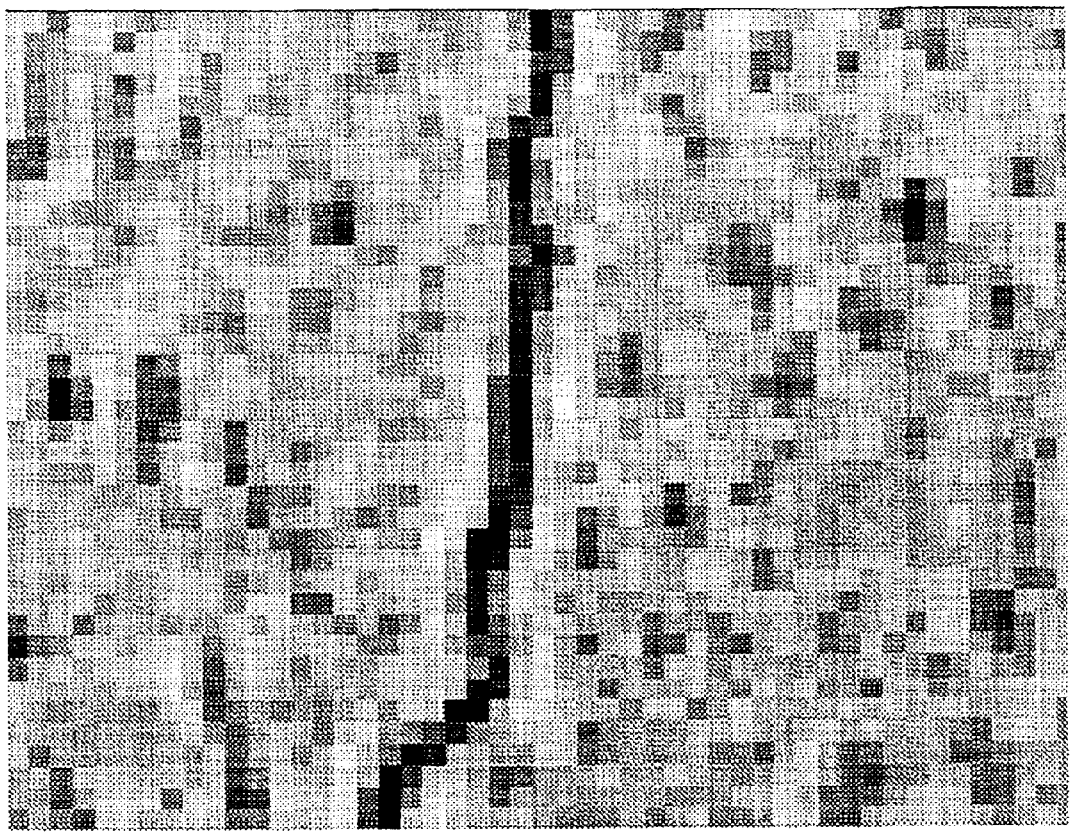
FIG. 9 is a drawing showing an example of a density distribution on the pixels of a crack image.

Next, the crack width evaluation process of step 5 of FIG. 4, the subject of the present invention, will be described. As described earlier, with regard to a digital still color image carrying photographic images of narrow cracks, a crack of a width corresponding to a size of less than a single pixel size on the image influences the density of a number of surrounding pixels on the image. Further, the wider the crack width, the larger number of surrounding pixels are influenced. The condition is illustrated in FIG. 9. In FIG. 9, one segment represents one pixel.

The present inventor has carefully observed enlarged images showing cracks of various widths, analyzed the relationship between the crack width and the number of pixels whose image data is 1 on the binarized image, and found a crack width evaluation method, which follows the following image processing procedure, by which the crack width can be evaluated with practically-usable accuracy.

Figure 10:
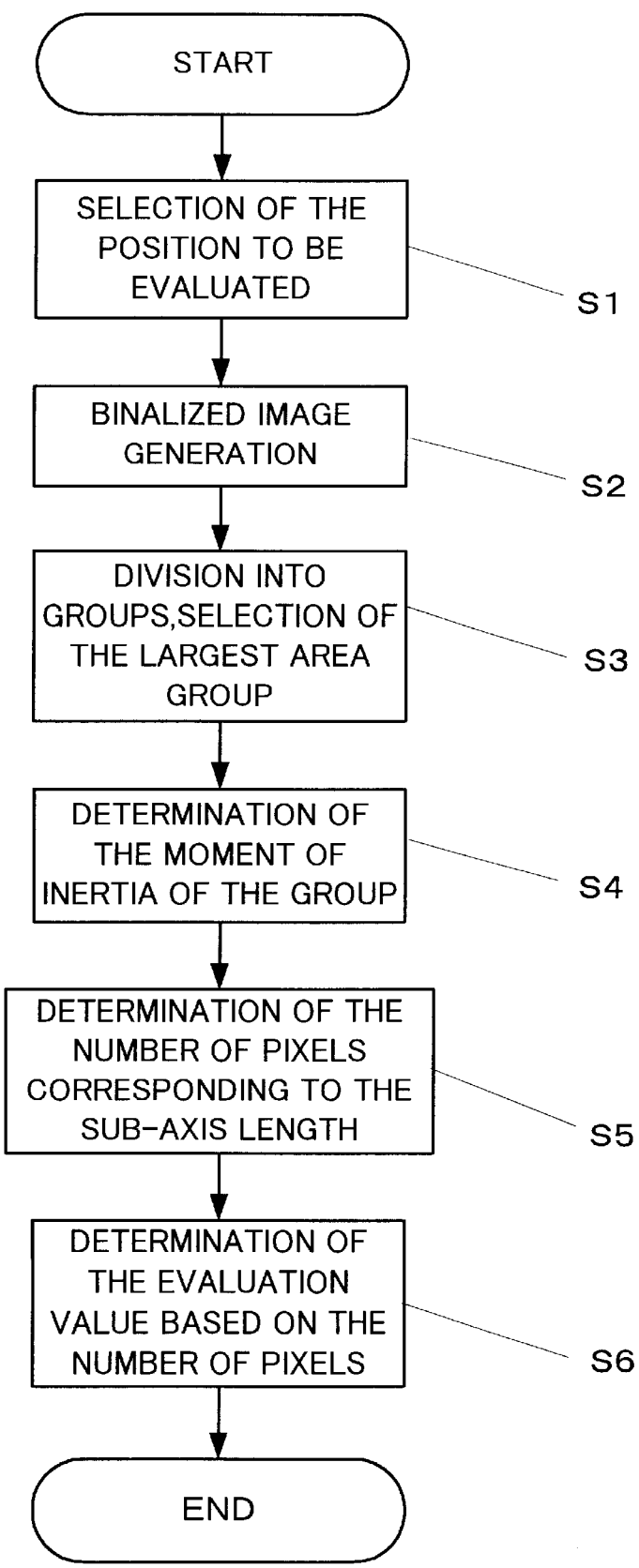
FIG. 10 is a flowchart illustrating the procedure for determining the crack width evaluation value.

FIG. 10 is a flowchart of the process according to the evaluation method, and in FIG. 11A~FIG. 11D, the images corresponding to the steps of the process are appropriately shown. This process is applied to a digital image already appropriately applied with the preceding steps of FIG. 4.

At step 1 of FIG. 10, the pixels within a predetermined area of which center corresponds to a point specified by the operator with a mouse-click on the crack-carrying image as the position where the crack width is to be evaluated are selected. As is shown in FIG. 11A, the predetermined area is displayed on the crack-carrying image.

The size of the predetermined area can be set at the operator's discretion, and the size is set so that the area includes, as much as possible, neither a plurality of crack images nor isolated large-area non-crack images. According to the above-mentioned observation, a size of about 40*40 pixel, for example, is suitable.

At step 2, the image within the predetermined area (40*40 pixel size) is converted into a binalized image in which the image data value of the crack image are made 1 by using a predetermined gradation value set as a threshold value, and the binalized image is displayed. FIG. 11B shows the binalized image displayed in a separate window. It is to be noted that the crack portion displayed in FIG. 11B is different from that of FIG. 11A. The predetermined gradation value set as a threshold value is determined so that the crack portion subject to the evaluation is distinguished as much as possible from the other portions, especially from noise. At the occasion of the threshold value determination, the threshold value may be determined for each color component (R-G-B or C-Y-M-G) if necessary.

At step 3, the pixels of which image data value is 1 within the binalized image are divided into pixel groups so that, in each of the pixel groups, every pixel connects to at least one of the other pixels; the area (number of pixels) of each pixel group is determined; and the largest area pixel group is selected. FIG. 11C shows the image of the selected pixel group.

At step 4, the moment of inertia of the selected pixel group is determined.

At step 5, a main-axis length and a sub-axis length of a rectangle of which area and moment of inertia are equal to the area and moment of inertia of the selected pixel group are determined, and the number of pixels corresponding to the sub-axis length is determined by dividing sub-axis length by size of pixel (FIG. 11D). The main-axis means a longitudinal axis of the rectangle and sub-axis means perpendicular axis to the longitudinal axis.

At step 6, an evaluation value of the crack width is determined based on the determined number of pixels corresponding to the sub-axis length, and the evaluation value is displayed near the above-mentioned position specified with a mouse-click. The correspondence relationship between the number of pixels and the evaluation value depends on the shooting magnification; but, the inventor has found that, at the above-mentioned shooting magnification that allows a shot area a little larger than that of 2*2 m, assigning the pixel number ranges 1~3, 4~5, 6~7, and 8~12 to the evaluation values 0.2 mm, 0.4 mm, 0.6 mm, and 0.8 mm, respectively, results in good correspondence with the actual measurement results.

As described above, the correspondence relationship between the number of pixels of which image data is 1 and the crack width evaluation value depends on the shooting magnification. However, with experiments, similar to the above, varying the shooting magnification, the above evaluation values having a high first-order correlation with the actual crack width measurement value can be determined based on the number of pixels.

Figure 12:
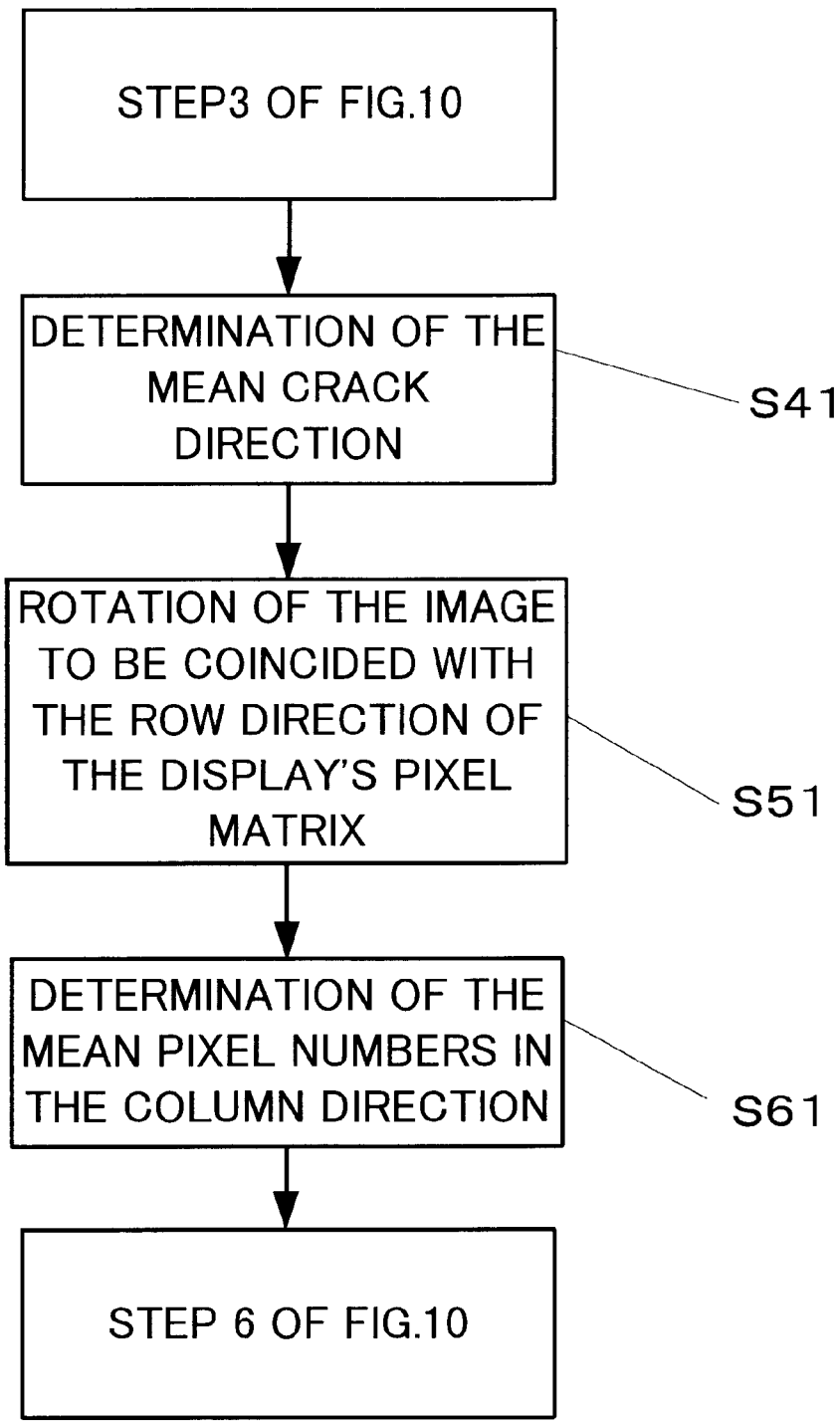
FIG. 12 is a flowchart of different process procedure replacing a part of the process of FIG. 10.
Figure 13A:
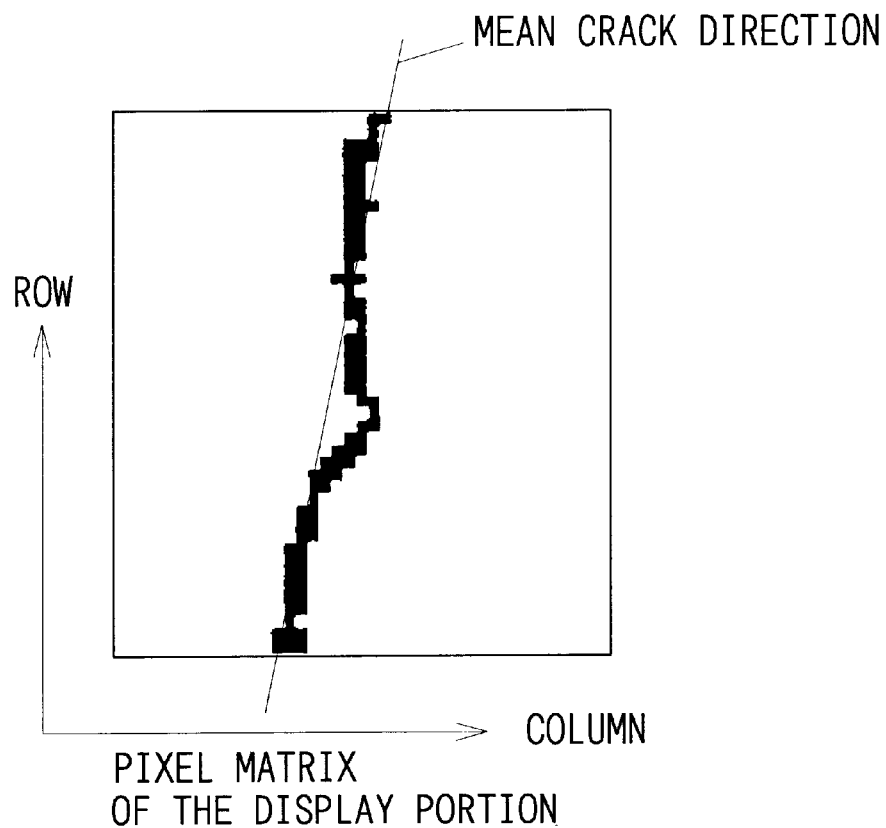
FIG. 13 is a drawing illustrating the process of FIG. 12.
Figure 13B:
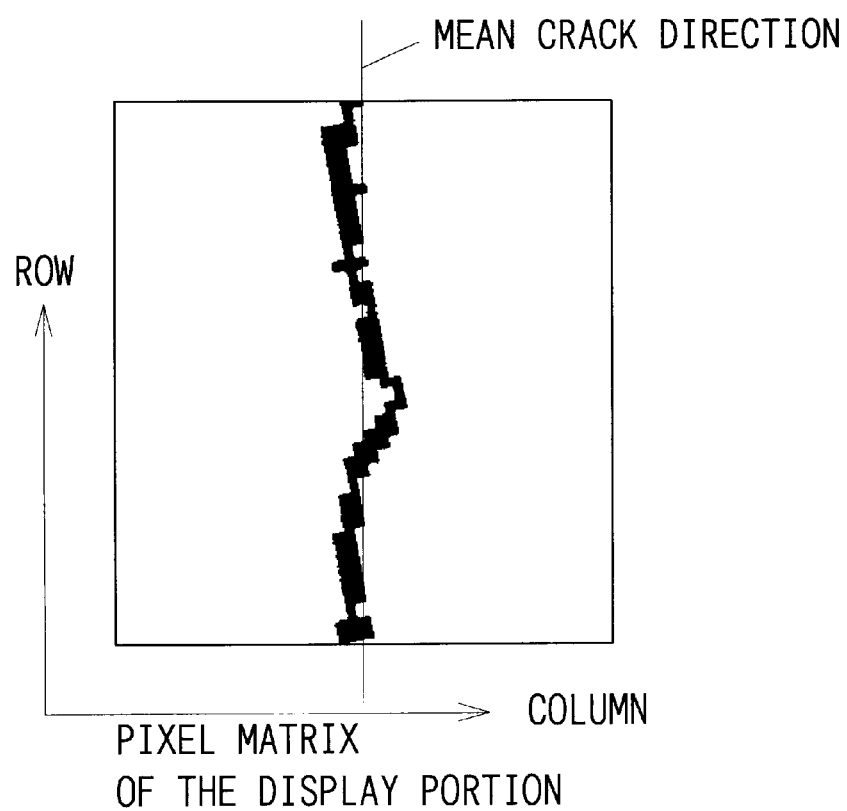

Although steps 4 and 5 of FIG. 10 represent the steps for determining the number of pixels corresponding to the crack width, another process may be used to determine the number of pixels corresponding to the crack width. For example, the process executed by steps 4 and 5 of FIG. 10 may be replaced with the process executed by steps 41, 51, and 61, the process procedure of which is illustrated in FIG. 12. FIG. 13A and FIG. 13B illustrate the process of FIG. 12.

The process of step 41~step 61 will be now described. The mean crack direction (see FIG. 13A) is determined based on the position of the pixels belonging to the largest area pixel group selected at step 3 (step 41). The mean crack direction can be determined, for example, as the direction of the least squares line calculated based on the pixels' positions or as the direction of the line passing through the most mutually distant two pixels. The mean crack direction corresponds to the direction of the main-axis of step 5 of FIG. 10.

Next, the image is rotated so that the mean crack direction coincides with one direction (for example, the row direction) of the display portion's pixel matrix (step 51). FIG. 13B shows the image experienced the process of step 51. Further, the mean value of the number of the pixels of which binalized image data is 1 determined for each row is determined over the other direction (for example, the column direction) of the display portion's pixel matrix (step 61).

The mean pixel number corresponds to the crack width and thus to the subaxis length of step 5 of FIG. 10.

By making the image processing apparatus memorize the plurality of correspondence relationship data corresponding different shooting magnifications and by performing the above-mentioned process by the use of a correspondence relationship datum in response to a particular shooting magnification, different photographic images taken in under various kinds of shooting conditions can be addressed.

The above-described correspondence relationship might also depends on the processing method by which the color of the color component assigned to each pixel is determined. Thus, the correspondence relationship should be determined on the model of the utilized digital camera basis.

Note that the sequence of step 1 and step 2 in FIG. 10 may be altered. In other words, it may be so configured that the overall digital still image read is first converted into a binalized image; the image data of the binalized image within a predetermined area near the position specified as the position where the crack width is to be evaluated are selected; and that step 3 and the steps thereafter are applied to the selected binalized image data. However, the sequence shown in FIG. 10 is preferred because the area to be binalized is smaller resulting in smaller data size to be processed.

Further, in step 2, the image is converted into a binalized image in which the image data value of the crack image are made 1, and the binalized image is displayed; but, it may be so configured that the image is converted into a binalized image in which the image data value of the crack image are made 0, and the binalized image is displayed. In this case, the processes thereafter are applied to the pixels having image data 0.

Now, the reason that, with regard to a digital still color image carrying narrow width crack photographic images, a crack of a width corresponding to a size of less than a single pixel size on the image influences will be considered.

Each pixel of the image pick-up device of a digital camera receives light through one of red-, blue-, and green-filters, or through one of magenta-, cyan-, yellow-, and green-filters. Consequently, each pixel outputs the signal of which intensity corresponds to the color component intensity of the object's image. The color of each particular pixel is then determined based on the assigned color to and the outputted signal intensity from each pixel of the pixels within a predetermined neighboring area surrounding the particular pixel with a predetermined calculation program loaded on a calculation means in the digital camera. As a result, it can be inferred that even when the crack width is narrower than a single pixel size, the density of a number of neighboring pixels is influenced.

It is to be noted that, with regard to the predetermined calculation program, various kinds of methods are adopted depending on the manufacturer and model of the digital camera.

Figure 14:
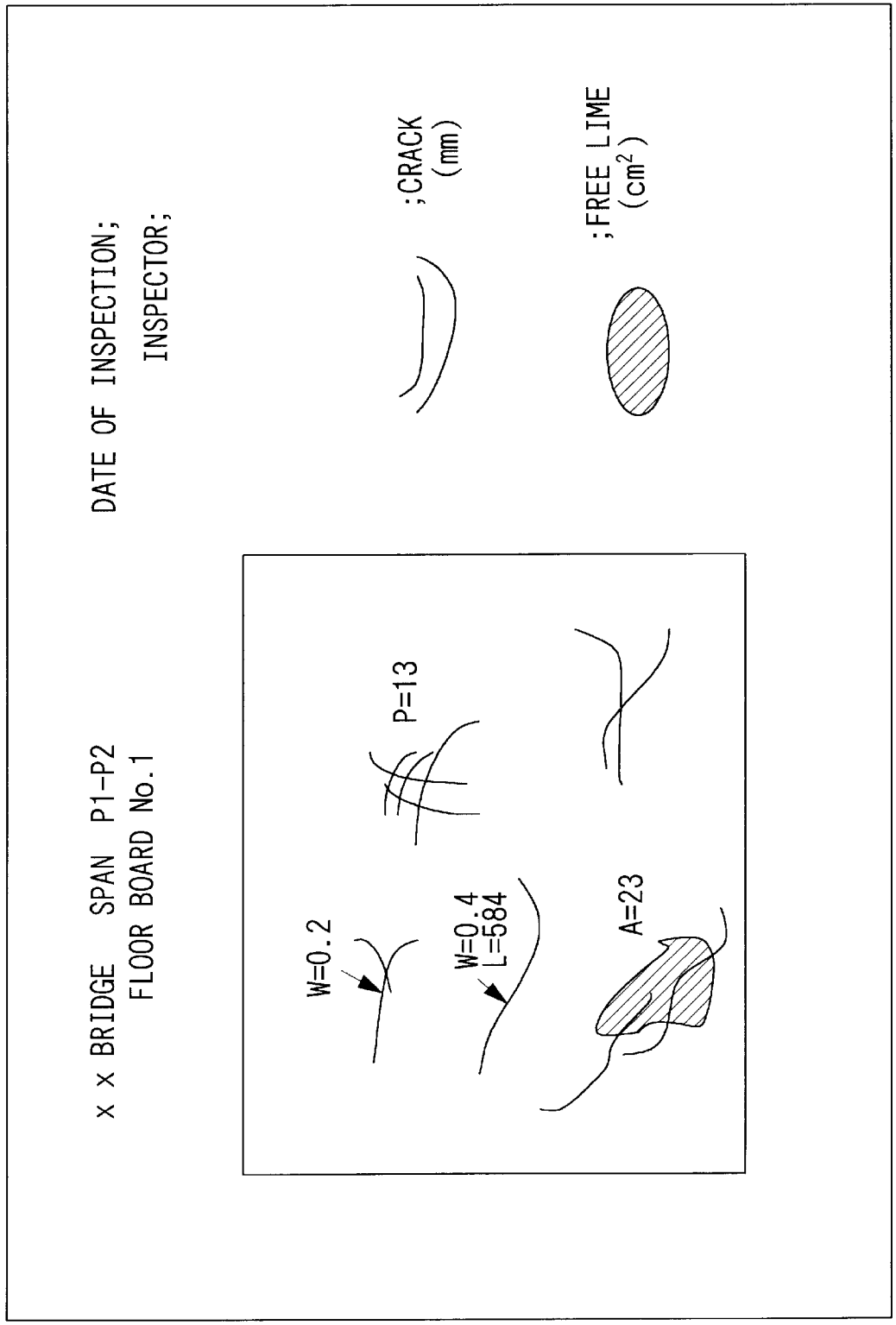
FIG. 14 is an example of a sketch drawing created by the sketch generating process of FIG. 4.

The sketch generating process of step 6 of FIG. 4 is a process in which the outline of the floor board, the pointer path traced during the simplified measurement process, the values determined by the measurement process, and the evaluation results of the crack width are created as a sketch drawing shown in FIG. 14.

Although, in the above-described embodiment, a floor board of a concrete bridge is targeted on, concrete floor boards, such as a wall surface of a concrete structure, can generally been targeted on.

The target object of the present invention apparatus is not to be limited to a concrete structure, but the present invention can also be applied to structures made from various kinds of materials, for example, steel bridges and various kinds of structures, by separately determining the correspondence relationship between the number of pixels and the evaluation value through observation and experiment similar to the above.

The crack evaluation apparatus of the present invention facilitates numerical evaluation of the width of a crack on a concrete struture corresponding to a size less than a single pixel size of an image pick-up device of a digital camera by the use of image processing. As a result, the crack evaluation can be quickly performed, and the maintenance and control of the concrete structure can be effectively done.

What is claimed is:

1. An image processor for a digital image of an object having a crack, the digital image being made of a plurality of pixels, comprising:

a counter for counting a number of the pixels relating to the crack within a selected portion of the image, the selected portion being of a known area;

an investigator for investigating the degree of dispersion of the pixels represented by the moment of inertia of the pixels relating to the crack within the selected portion of the image; and a width evaluator for evaluating the width of the crack corresponding to the selected portion of the image on the basis of the number of the pixels and the relationship among the pixels.

2. The image processor according to claim 1, wherein the width evaluator is designed to convert an area determined by the counted number of the pixels into a rectangle of the same area with the moment of inertia kept for determining the width of the crack on the basis of the width of the rectangle.

3. The image processor according to claim 1, further comprising a noise eliminator for eliminating pixels not relating to the crack from the selected portion of the image so that the pixels not relating to the crack is not counted by the counter.

4. The image processor according to claim 3, wherein the noise eliminator is designed to eliminate pixels not leading to the pixels relating to the crack.

5. The image processor according to claim 4, wherein the noise eliminator comprises a divider for dividing the pixels seeming to relate to the crack into a plurality of groups, pixels in each group being continuous within the group and separated with a gap from pixels in any of the other groups, and a maximum group finder for finding a group with the maximum number of pixels seeming to relate to the crack to serve the pixels in the maximum group as the pixels really relating to the crack and eliminate the pixels in the other groups as noises.

6. The image processor according to claim 1, further comprising a converter for converting the digital image into a binary image to facilitate the counting of the pixels relating to the crack by the counter.

7. The image processor according to claim 1, wherein the digital image of the object having a crack is a color digital image.

8. The image processor according to claim 1, further comprising a compensator for compensating a distortion of the digital image to get an orthogonal projection image, wherein the selected portion of the image is set on the orthogonal projection image.

9. The image processor according to claim 1, further comprising a monitor displaying the image of the object having the crack for a designation of the selected portion on the monitor.

10. The image processor according to claim 1, wherein the width of the crack to be evaluated is less than the size of the pixel on the image.

11. An image processor for a digital image of an object having a crack, the digital image being made of a plurality of pixels, comprising:

an input of a digital image of an object having a crack;

a compensator for compensating a distortion of the image to get an orthogonal projection image;

a converter for converting the image into a binary image;

a monitor for designating a selected portion of the orthogonal projection image on the monitor, the selected portion being of a known area;

a noise eliminator comprising a divider for dividing the pixels seeming to relate to the crack into a plurality of groups within the selected portion of the binary image, pixels in each group being continuous within the group and separated with a gap from pixels in any of the other groups, and a maximum group finder for finding a group with the maximum number of pixels seeming to relate to the crack to serve the pixels in the maximum group as the pixels really relating to the crack and eliminate the pixels in the other groups as noises;

a counter for counting a number of the pixels relating to the crack within the selected portion of the binary image;

an investigator for investigating the degree of dispersion of the pixels represented by the moment of inertia of the pixels relating to the crack within the selected portion of the binary image, and a width evaluator for converting an area determined by the counted number of the pixels into a rectangle of the same area with the moment of inertia kept for determining the width of the crack on the basis of the width of the rectangle.

12. The image processor according to claim 11, wherein the converter converts the orthogonal projection image into a binary orthogonal projection image, and wherein the selected portion is designated on the binary orthogonal projection image.

13. The image processor according to claim 11, wherein the compensator compensates the binary image into a binary orthogonal projection image, and wherein the selected portion is designated on the binary orthogonal projection image.

14. The image processor according to claim 11, wherein the selected portion is designated on the orthogonal projection image prior to the conversion of the image into the binary image by the converter.

15. The image processor according to claim 11, wherein the digital image at the input is a color digital image, and wherein the width of the crack to be evaluated is less than the size of the pixel on the image.

* * * * *